US012400001B2

(12) United States Patent
Bailey et al.

(10) Patent No.: US 12,400,001 B2
(45) Date of Patent: Aug. 26, 2025

(54) SYSTEMS AND METHODS FOR ASSET BASED EVENT PRIORITIZATION FOR REMOTE ENDPOINT SECURITY

(71) Applicant: Open Text Holdings, Inc., San Mateo, CA (US)

(72) Inventors: Michael James Bailey, Pasadena, CA (US); Ricardo Jose Moncada, Valley Village, CA (US); Craig Sam Wong, Monterey Park, CA (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 202 days.

(21) Appl. No.: 17/903,783

(22) Filed: Sep. 6, 2022

(65) Prior Publication Data

US 2023/0070650 A1 Mar. 9, 2023

Related U.S. Application Data (60) Provisional application No. 63/240,690, filed on Sep. 3, 2021.

(51) Int. Cl.
*H04L 9/40* (2022.01)
*G06F 21/57* (2013.01)
*G06F 21/62* (2013.01)

(52) U.S. Cl.
CPC ........ *G06F 21/577* (2013.01); *G06F 21/6218* (2013.01); *H04L 63/1416* (2013.01); *G06F 2221/034* (2013.01)

(58) Field of Classification Search
None
See application file for complete search history.

(56) References Cited

U.S. PATENT DOCUMENTS

| 7,433,864 | B2 * | 10/2008 | Malik | G06F 16/951 |
| 9,800,605 | B2 | 10/2017 | Baiakalov et al. | |
| 10,735,272 | B1 * | 8/2020 | Saurabh | G06F 21/554 |
| 10,904,277 | B1 * | 1/2021 | Sharifi Mehr | H04L 63/1425 |
| 2007/0169194 | A1 * | 7/2007 | Church | H04L 63/1416 726/23 |

(Continued)

OTHER PUBLICATIONS

International Search Report and Written Opinion (ISR/WO) issued for International PCT Application No. PCT/US22/42644, mailed Jan. 11, 2023, 7 pages.

(Continued)

*Primary Examiner* — Joshua Joo
(74) *Attorney, Agent, or Firm* — SPRINKLE IP LAW GROUP (57) ABSTRACT

Systems and methods for event threat prioritization are provided. In some embodiments, an event priority engine receives event data detected by event agents executing on devices. The events are prioritized and ranked according to threat scores for events generated according to threat indicators which are fed event data and threat data. In some embodiments, security systems may take the approach of prioritizing events based on the endpoints from which they originate using attributes associated with those endpoints. In this way, events can be prioritized at least in part based on the damage to the enterprise that may occur if those events were to compromise security, not just the likelihood of those events actually resulting in a security breach.

20 Claims, 4 Drawing Sheets

(56) References Cited

U.S. PATENT DOCUMENTS

| | | | |
|---|---|---|---|
| 2017/0063907 A1 | 3/2017 | Muddu et al. | |
| 2018/0234434 A1* | 8/2018 | Viljoen | H04L 63/145 |
| 2019/0044963 A1* | 2/2019 | Rajasekharan | G06N 20/00 |
| 2019/0102469 A1 | 4/2019 | Makovsky et al. | |
| 2019/0158514 A1* | 5/2019 | Huang | G06F 21/6254 |
| 2020/0134189 A1* | 4/2020 | Carter | G06F 21/645 |
| 2020/0162505 A1 | 5/2020 | Nachenberg et al. | |
| 2020/0287925 A1* | 9/2020 | Wang | H04L 63/1425 |
| 2021/0250372 A1* | 8/2021 | Barnes | H04L 41/12 |
| 2023/0109926 A1* | 4/2023 | Nair | G06F 21/552 |
| | | | 726/25 |
| 2023/0153430 A1* | 5/2023 | Jin | G06F 21/56 |
| | | | 726/23 |
| 2023/0306131 A1* | 9/2023 | Le Bouthillier | H04L 9/0643 |
| 2024/0340318 A1* | 10/2024 | Dubois | H04L 63/0263 |
| 2025/0112940 A1* | 4/2025 | dos Santos | H04L 63/1425 |

OTHER PUBLICATIONS

International Preliminary Report on Patentability (IPRP) issued by the International Bureau of WIPO for International PCT Application No. PCT/US22/42644, mailed Mar. 14, 2024, 6 pages.

European Search Report issued by the European Patent Office (EPO) for European Patent Application No. 22865652.6, mailed May 22, 2025, 9 pages.

\* cited by examiner

SYSTEMS AND METHODS FOR ASSET BASED EVENT PRIORITIZATION FOR REMOTE ENDPOINT SECURITY

CROSS-REFERENCE TO RELATED APPLICATION(S)

This application claims a benefit of priority under 35 U.S.C. § 119(e) from U.S. Provisional Application No. 63/240,690, filed Sep. 3, 2021, entitled "SYSTEMS AND METHODS FOR ASSET BASED EVENT PRIORITIZATION FOR REMOTE ENDPOINT SECURITY," which is fully incorporated by reference herein for all purposes.

TECHNICAL FIELD

This disclosure relates generally to the field of computer network security. More particularly, this disclosure relates to endpoint agent management systems, methods, and computer program products for remote endpoint security in a distributed network computing environment. Specifically, embodiments of this disclosure relate to prioritizing events that occur on remote endpoint systems.

BACKGROUND

Endpoint security generally refers to securing endpoints (entry points) of end-user devices, for instance, desktop computers, laptop computers, mobile devices, wireless device, etc. that are used by users (e.g., employees of an enterprise) of a secure computer network (e.g., an enterprise computer network, as opposed to a public network such as the Internet). The connections of these endpoints to the secure computer networks create possible attack paths that could be exploited by malicious actors and campaigns. To address ever evolving security threats to a secure computer network, an endpoint security system can be installed on a computer network to provide comprehensive defense mechanisms, including antivirus scanning, threat detection, investigation and response, device management, data leak protection, and so on.

Such an endpoint security system can usually be a pull-based system, which means that clients of the endpoint security system would call out and communicate with target nodes (endpoints). Today, however, more and more users work remotely outside of their respective secure computer networks, with the endpoints that they use for work being outside of, and remote from, the secure computer networks (e.g., while traveling and logged in to a hotel's wireless network and then logged in to an enterprise computer network over the Internet). That is, from the perspective of network security, the endpoints are no longer confined to a small area or a local network. This means that the agents that work on the endpoints can virtually be anywhere. This kind of agent mobility, and potential dysconnectivity, can make it difficult for a pull-based endpoint security system to manage agents effectively and efficiently.

In particular, in many cases events are reported from agents across an enterprise environment. There may be thousands, hundreds of thousands or even millions of these events within a given time frame. Some of these events may represent security risks to the enterprise while others may represent typical activity. These events are usually reviewed by a user associated with an enterprise or a security system to determine which of the events represent security risks or when remedial or other actions should be taken to secure an endpoint or an enterprise. The sheer volume of these events is, however, highly problematic when it comes to such analysis. There may be a large number of false positives (e.g., events that are detected but that don't represent a security risk) while at the same time, security events associated with extreme risk to an endpoint or an enterprise may get buried under the avalanche of events and may never be surfaced to a reviewer or such events.

It is desired that the most important events (e.g., the one that represent the highest security risk to an endpoint or enterprise) be prioritized (e.g., for review or other action), such that these events may be analyzed first. This prioritization is non-trivial. Attackers are constantly evolving their techniques and attacks may occur at multiple levels of the application or network stack on which modern computing systems are based. In fact, events associated with many hacks of endpoint devices or enterprises are actually detected and reported, but are never evaluated or acted upon as they are buried in the sea of noise that is the flood of events that are continually captured.

Previous attempts at prioritizing events have mostly relied on analysis of the events themselves for such prioritization. For instance, some previous attempts at prioritizing these events have been based on pattern matching of various captured events whereby events or sequences of events are compared to patterns associated with "kill chains", which represent sets of steps that attackers usually preform when attempting to compromise an endpoint device. Such pattern matching requires grouping and correlation of events, a difficult problem. Moreover, in addition to being complex, such pattern matching techniques are reactive only, they may only prioritize events based on what attackers have done in the past. They cannot adapt to new mechanisms or patterns of attack.

SUMMARY

Instead of prioritizing events solely based on an analysis of the events themselves, embodiments of security systems as disclosed herein may take the approach of prioritizing events based on the endpoints from which they originate using the attributes associated with those endpoints. For example, a determination can be made about which endpoints, if compromised, would have the severest or worst impact on the security of the enterprise. This may involve the prioritization of the endpoint based on criteria about the endpoints. Other information about the endpoints and events may also be used to prioritize the events as well. In this way, events are prioritized at least in part based on the damage to the enterprise that may occur if those events were to compromise security, not just the likelihood of those events actually resulting in a security breach.

In one embodiment, for example, the amount of sensitive data on an endpoint may be utilized to prioritize events that originate with an endpoint. A key insight to embodiments is that attackers are usually after important information of the enterprise, referred to generally herein as sensitive data (e.g., Personally Identifiable Information (PII) such as employee records for a health care company, Social Security Numbers (SSN), Credit Card numbers, source code for a software company, etc.). Thus, events may be prioritized based on their association with endpoints that include such sensitive data, and endpoints prioritized based on the amount or type of sensitive information they include, or to which they have access.

Specifically, in one embodiment, a security system may have a risk manager that may find sensitive data on endpoint devices. For example, it may utilize an agent having access to an endpoint device. The risk manager may scan or otherwise access an endpoint to locate sensitive data on the endpoint device and find the amount of sensitive data on the endpoint device. The amount of sensitive data (e.g., a count of the number of hits for such sensitive information) may be kept in association with each endpoint. In certain embodiments, the risk manager may also allow a user to define or specify a pattern or type that defines such sensitive information. When data matching the pattern is located on an endpoint device this data may be surfaced to a user (e.g., the same or another user), who may review and confirm (or deny) that this data is sensitive data. In this manner, not only may a count of (e.g., a number of occurrences of) sensitive data be associated with an endpoint, but in some cases, such a count may be a count of confirmed sensitive data. The risk manager may thus allow a highly specific determination of which endpoints really have sensitive information or that have access to such sensitive information. Additional information may also be maintained about the occurrence of sensitive data, such as when the occurrence of sensitive data was found at the endpoint device.

Thus, an event prioritization of a security system may prioritize events received from the various endpoints in an enterprise based on the number of hits for sensitive data for that endpoint. These may be the number of hits for sensitive information on each endpoint discovered by the risk manager (e.g., the number of raw hits unreviewed by a user), or a number of confirmed occurrences of sensitive data on each endpoint device, or some combination. In particular, events associated with an endpoint device with the greatest occurrence of sensitive data may be prioritized over those from an endpoint device with fewer occurrences of sensitive data. In one embodiment, a prioritization score may be determined for an event, with the prioritization score based at least in part on the number of occurrences of sensitive data on the endpoint from which the event originated.

Moreover, additional weighting may be applied to prioritize the events based on other attributes associated with the event or endpoint, such as the timing of the events or the timing of when occurrences of sensitive data were found on an endpoint device. For example, a weighting factor may be applied in generating the prioritization (e.g. score) of an event (or the events) based on the timing of the occurrences of sensitive data on the endpoint device associated with the events, such as the recency with which the occurrences of the sensitive data took place (e.g., were found) on the endpoint device. As another way of applying a timing factor to the determination of a priority score, the number of occurrences of sensitive data for an endpoint may be determined based on a time window, such that only (e.g., confirmed) occurrences of sensitive data on an endpoint device that occurred within a time window (e.g., the past month, past week, etc.) may be utilized in prioritizing events from that endpoint.

As another example, the prioritization score for an event could be based on an "asset value" attribute that is associated with an endpoint device. As some endpoints may be utilized in a manner that accesses, or may have access to, more sensitive data (e.g., a device used by user in human resources may have access to more sensitive data than a device used by a sales manager, an E-mail server may have access to sensitive data, etc.), a weighting factor may be applied to prioritize events from an endpoint based on the asset value of that endpoint device. Such an asset value may be determined, for example, from metadata associated with an endpoint indicating the importance of that endpoint.

Attributes associated with events may also be used to prioritize the events. As an example, each event may also have an "internal" priority associated with it. Such an internal priority may result from an evaluation of the event at the time the event was generated or may result from the assignment of priority to the event by another event prioritization mechanism. This internal event priority may be utilized by the prioritization scoring algorithm in generating a prioritization score for the event (e.g., relative to other events).

Another factor that may be associated with the event (or the endpoint) is a threat reputation associated with one or more network connections (e.g., IP addresses) associated with the event. Specifically, in certain cases, when an event is reported, the event may have a list of open network connections for the endpoint device and identifiers of systems connected to the endpoint device through that network connection (e.g., IP addresses). These IP addresses or other identifiers associated with connections to the endpoint device may be used to identify a reputation score associated with the event (e.g., by passing the IP address or other identifier to a reputation score generator such as threat intelligence tools such as Webroot's BrightCloud or the like). The prioritization algorithm can thus take these reputation scores into account when generating a prioritization score for an event.

As may be realized, embodiments of a security system may utilize or adjust these weights based on a variety of factors, including desired context of use or users' desires. Accordingly, a prioritization scoring algorithm may, for example, have default weights associated with the various attributes of endpoints or events (e.g., number of occurrences of sensitive data, whether the occurrence is confirmed, timing of occurrence of sensitive data, asset value of endpoint, etc.), where those weights may be adjusted based upon user preference. In particular, in one embodiment, the security system may offer an interface or other mechanism by which users may provide or adjust indicators of the importance of these attributes to the user. The weights of the scoring algorithm may be adjusted accordingly.

Accordingly, by prioritizing events based on the prioritization of the endpoints from which the events originated, a more effective prioritization mechanism for events can be obtained whereby events that may result in the most harm to an enterprise may be prioritized over other events (e.g., in certain cases even if those other events may actually represent a greater likelihood of such a security breach occurring).

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. The features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

It is desired that the most important events (e.g., the one that represent the highest security risk to an endpoint or enterprise) be prioritized (e.g., for review or other action), such that these events may be analyzed first. This prioritization is non-trivial. Attackers are constantly evolving their techniques and attacks may occur at multiple levels of the application or network stack on which modern computing systems are based. In fact, events associated with many hacks of endpoint devices or enterprises are actually detected and reported, but are never evaluated or acted upon as they are buried in the sea of noise that is the flood of events that are continually captured.

Previous attempts at prioritizing events have mostly relied on analysis of the events themselves for such prioritization. For instance, some previous attempts at prioritizing these events have been based on pattern matching of various captured events whereby events or sequences of events are compared to patterns associated with "kill chains", which represent sets of steps that attackers usually preform when attempting to compromise an endpoint device. Such pattern matching requires grouping and correlation of events, a difficult problem. Moreover, in addition to being complex, such pattern matching techniques are reactive only, they may only prioritize events based on what attackers have done in the past. They cannot adapt to new mechanisms or patterns of attack.

Instead of prioritizing events solely based on an analysis of the events themselves, embodiments of security systems as disclosed herein may take the approach of prioritizing events based on the endpoints from which they originate using the attributes associated with those endpoints. For example, a determination can be made about which endpoints, if compromised, would have the severest or worst impact on the security of the enterprise. This may involve the prioritization of the endpoint based on criteria about the endpoints. Other information about the endpoints and events may also be used to prioritize the events as well. In this way, events are prioritized at least in part based on the damage to the enterprise that may occur if those events were to compromise security, not just the likelihood of those events actually resulting in a security breach.

Figure 1:
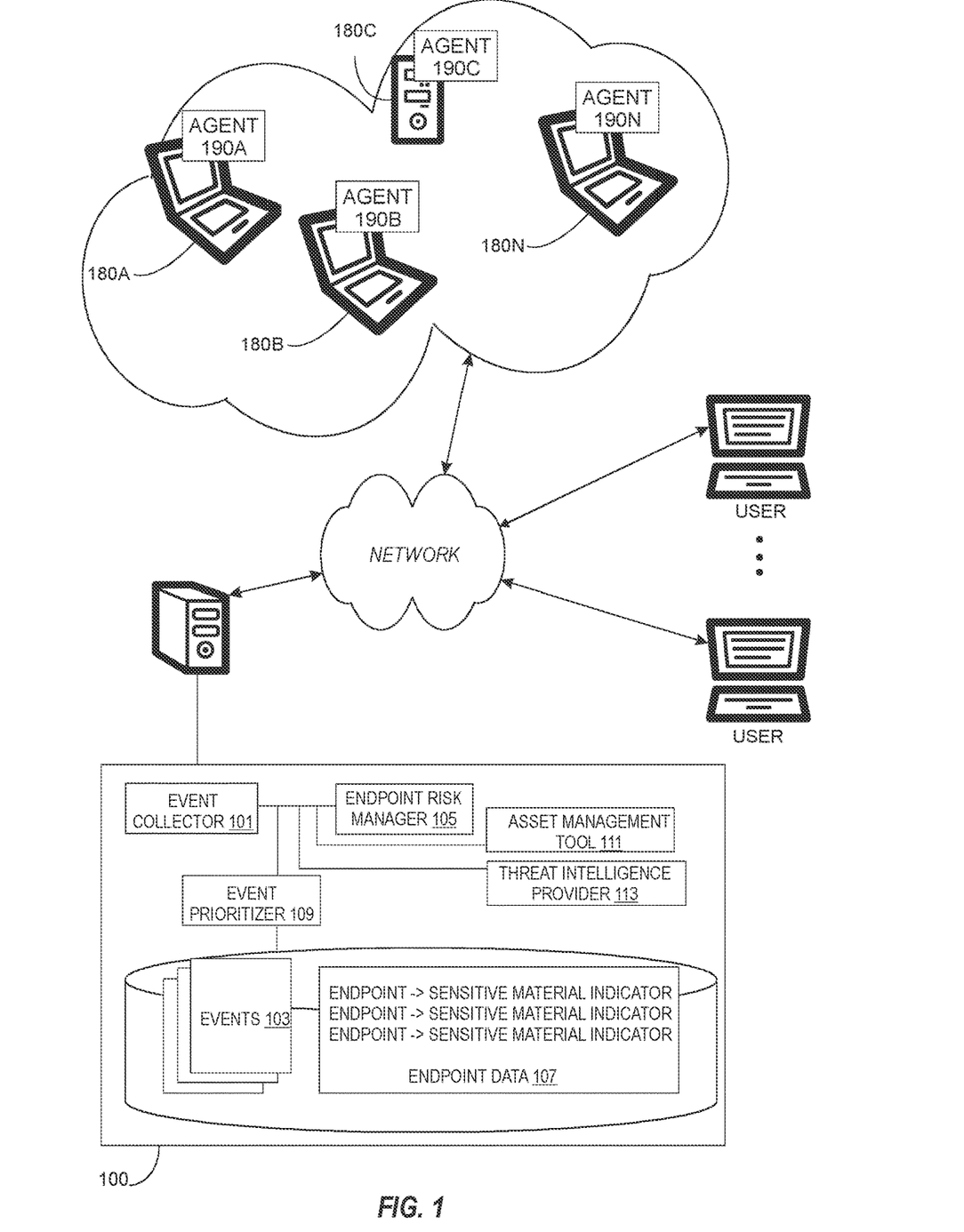
FIG. 1 depicts a diagrammatic representation of an endpoint security system with distributed endpoints.

As a non-limiting example, FIG. 1 depicts an endpoint security system 100 that can communicate with endpoints (e.g., endpoints 180A, 180B, 180C, . . . , 180N) on the Internet or other computer network. The endpoints 180 may be computers within an enterprise environment (e.g., an enterprise computer network such as an intranet, VPN, etc.) Endpoints 180 may also be other devices, such as a file server (e.g., endpoint 180C in FIG. 1). Endpoint security agents (e.g., agent 190A, 190B, 190C, . . . , or 190N) may run on endpoint devices (e.g., endpoint 180A). The agent is a low-level program that runs on the endpoint and performs the job on the endpoint, as requested by an application such as event collector 101. In today's enterprise working environment, employees can have corporate computers such as laptop computers, mobile devices, etc. outside of the enterprise computing environment. That is, endpoints of an enterprise computer network may not be or need to be on the premises of the enterprise and may instead be on some private or public network when using programs needed for their work (e.g., mail software, teleconferencing tools, etc.). Examples of jobs can include collecting and preserving potentially relevant data for various reasons, for instance, for security or investigative purposes, forensic purposes, discovery purposes, regulatory compliance purposes, and so on. The agent may have access to essentially everything on the of the endpoint such as storage, network data, etc. Various types of endpoint security jobs that could be performed by an agent are known to those skilled in the art and thus are not further described herein.

The event collector 101 of the endpoint security system 100 may thus interact with agents 190 on the endpoint devices 180 and obtain (e.g. receive) events from these agents 190. These types of events may relate to virus scanning, cybersecurity risk assessment or management, data forensic analysis, or other types of security events. These events may include a timestamp indicating when the event occurred and an identifier of the endpoint 180 on which the event occurred. This identifier may, for example by a fully qualified domain name (FQDN) or IP address, or some other identifier of the endpoint device 180 on which the event occulted. The event also includes data on the event, including for example lists of open network connections (e.g., and connecting IP address) on the endpoint device 180 or other data associated with the event. These events 103 are stored at the endpoint security system 100. As these events 103 are associated with identifiers for the endpoints 180 on which they originated they can be grouped by those endpoints or otherwise identified as originating from a particular endpoint 180.

Endpoint security system 100 may also have a risk manager 105, an asset management tool 111, and a threat intelligence provider 113. Risk manager 105 may find sensitive data on endpoint devices 180 and store that data as endpoint data 107. For example, it may utilize agent 190 having access to an endpoint device 180 to scan or otherwise access endpoint 180 to locate sensitive data on the endpoint device 180 and find the amount of sensitive data on the endpoint device. The amount of sensitive data (e.g., a count of the number of hits for such sensitive information) may be kept in association with each endpoint in endpoint data 107. The threat intelligence provider 113 could be a commercial provider such as BrightCloud Threat Intelligence Services. The asset management tool 111 can provide endpoint asset values to the event prioritizer 109.

In certain embodiments, the risk manager may also allow a user to define or specify a pattern or type that defines such sensitive information. When data matching the pattern is located on an endpoint device this data may be surfaced to a user (e.g., the same or another user), who may review and confirm (or deny) that this data is sensitive data. In this manner, not only may a count of (e.g., a number of occurrences of) sensitive data be associated with an endpoint, but in some cases, such a count may be a count of confirmed sensitive data. The risk manager 105 may thus allow a highly specific determination of which endpoints 180 really have sensitive information or that have access to such sensitive information. Additional information may also be maintained about the occurrence of sensitive data, such as when the occurrence of sensitive data was found at the endpoint device.

In particular, the risk manager 105 may also allow a user to define or specify a pattern or type that defines such sensitive information. When data matching the pattern is located on an endpoint device 180 this data may be surfaced to a user (e.g., the same or another user) through an interface. The user may review and confirm (or deny) that this data is sensitive data. In this manner, not only may a count of (e.g., a number of occurrences of) sensitive data be associated with an endpoint, but in some cases, such a count may be a count of confirmed sensitive data. The risk manager may thus allow a highly specific determination of which endpoints really have sensitive information or that have access to such sensitive information. Additional information may also be maintained about the occurrence of sensitive data, such as when the occurrence of sensitive data was found at the endpoint device 180.

In certain embodiments, a user may configure patterns of sensitive data for risk manager 105 to search for (e.g. PII, PCI, SSN, etc.) along with the data sources (e.g., endpoint devices 180) to search. Risk manager 105 may scan these configured data sources on a recurring basis for these configured patterns for sensitive data. The text or other data associated with the pattern may be extracted from each location where the pattern is found (e.g., document or other content). In some cases this text can be broken up into "grafs" (a small chunk of text on the order of one to four sentences). These grafs and their use may be better understood with reference to commonly-owned US Patent Application Publication 2014/0143680, which is fully incorporated by reference herein for all purposes.

The risk manager 105 can then present a user with an interface to review potentially sensitive data occurrences and confirm (or deny) such occurrences. In some cases the user may not review a full document, but may only review a graf from a sensitive data occurrence. For example, a user can mark documents (or grafs) as false positives or confirmed (true positives) sensitive data hits. This data may be stored in the endpoint data 107. In this manner, risk manager 105 may store endpoint data 107 on how many unconfirmed or confirmed sensitive data occurrences have occurred per endpoint device 180, the number of documents including such sensitive data or other data on the occurrences of sensitive data on endpoint devices 180.

Event prioritizer 109 may utilize this endpoint data 107 to prioritize events 103 such that events with relatively higher priority may be presented or otherwise surfaced to a user of the security system 100. In one embodiment, event prioritizer 109 may determine a priority metric or score (used interchangeably) for events based at least in part on a prioritization of the endpoint device 180 from which those events were obtained. For example, a priority of endpoints 180 may be determined and events from the highest priority endpoint may receive the highest priority, etc.

Specifically, instead of prioritizing events 103 solely based on an analysis of the events 103 themselves, embodiments of security systems as disclosed herein may take the approach of prioritizing events 103 based on the endpoints 180 from which they originate using the attributes associated with those endpoints 180. For example, a determination can be made about which endpoints 180, if compromised, would have the severest or worst impact on the security of the enterprise. This may involve the prioritization of the endpoint 180 based on attributes of the endpoints 180. Other information about the endpoints 180 and events 103 may also be used to prioritize the events 103 as well. In this way, events 103 are prioritized at least in part based on the damage to the enterprise that may occur if those events 103 were to compromise security, not just the likelihood of those events actually resulting in a security breach.

In one embodiment, for example, the amount of sensitive data on an endpoint 180 may be utilized to prioritize the endpoints 180 and thus to prioritize the events 103 that originate with an endpoint 180. A key insight to embodiments is that attackers are usually after important information of the enterprise, referred to generally herein as sensitive data (e.g., PIIs such as employee records for a health care company, SSN, Credit Card numbers, etc.). Thus, events 103 may be prioritized based on their association with endpoints 180 that include such sensitive data, and endpoints 180 prioritized based on the amount or type of sensitive information they include, or to which they have access.

Thus, an event prioritizer 109 of a security system 100 may prioritize events 103 received from the various endpoints 180 in an enterprise based on the number of hits for sensitive data for that endpoint 180 as included in the endpoint data 107. These may be the number of hits for sensitive information on each endpoint 180 discovered by the risk manager 105 (e.g., the number of raw hits unreviewed by a user), or a number of confirmed occurrences of sensitive data on each endpoint device 180, or some combination. In particular, events 103 associated with an endpoint device with the greatest occurrence of sensitive data as included in the endpoint data 107 may be prioritized over those from an endpoint device 180 with fewer occurrences of sensitive data. In one embodiment, a prioritization score may be determined for an event 103, with the prioritization score based at least in part on the number of occurrences of sensitive data on the endpoint from which the event originated.

Moreover, additional weighting may be applied to prioritize the events 103 based on other attributes associated with the event or endpoint 180, such as the timing of the events 103 or the timing of when occurrences of sensitive data were found on an endpoint device 180. For example, a weighting factor may be applied in generating the prioritization (e.g.

score) of an event 103 (or the events) based on the timing of the occurrences of sensitive data on the endpoint device 180 associated with the events 103, such as the recency with which the occurrences of the sensitive data took place (e.g., were found) on the endpoint device 180. As another way of applying a timing factor to the determination of a priority score, the number of occurrences of sensitive data for an endpoint 180 may be determined based on a time window, such that only (e.g., confirmed) occurrences of sensitive data on an endpoint device 180 that occurred within a time window (e.g., the past month, past week, etc.) may be utilized in prioritizing events from that endpoint 180.

As another example, the prioritization score for an event 103 could be based on an "asset value" attribute that is associated with an endpoint device 180. As some endpoints 180 may be utilized in a manner that accesses, or may have access to, more sensitive data (e.g., a device used by user in human resources may have access to more sensitive data than a device used by a sales manager, an E-mail server may have access to sensitive data, etc.), a weighting factor may be applied to prioritize events 103 from an endpoint 180 based on the asset value of that endpoint device 180. Such an asset value may be determined, for example, from metadata associated with an endpoint indicating the importance of that endpoint. Such metadata may be stored for example, in endpoint data 107 and obtained by agent 190 on endpoint device 180.

Attributes associated with events 103 may also be used to prioritize the events 103. As an example, each event 103 may also have an internal priority associated with it. Such an internal priority may result from an evaluation of the event 103 at the time the event 103 was generated by agent 190 or may result from the assignment of priority to the event by another event prioritization mechanism. This internal event priority may be utilized by event prioritizer 109 in generating a prioritization score for the event (e.g., relative to other events).

Another factor that may be associated with the event (or the endpoint) is a threat reputation associated with one or more network connections (e.g., IP addresses) associated with the event 103. Specifically, in certain cases, when an event is reported, the event may have a list or snapshot of open network connections for the endpoint device and identifiers of systems connected to the endpoint device through that network connection (e.g., IP addresses). These IP addresses or other identifiers associated with connections to the endpoint device 180 may be used to identify a reputation score associated with the event 103 (e.g., by passing the IP address or other identifier to a reputation score generator such as threat intelligence tools such as Webroot's BrightCloud or the like). The prioritization algorithm of the event prioritizer 109 can thus take these reputation scores into account when generating a prioritization score for an event. The file reputation may, in turn, be based on hashes or URL categorization (e.g., based on a DNS hash or the like).

As may be realized, embodiments of a security system may utilize or adjust these weights based on a variety of factors, including desired context of use or users' desires. Accordingly, a prioritization scoring algorithm may, for example, have default weights associated with the various attributes of endpoints or events (e.g., number of occurrences of sensitive data, whether the occurrence is confirmed, timing of occurrence of sensitive data, asset value of endpoint, etc.), where those weights may be adjusted based upon user preference. In particular, in one embodiment, the security system may offer an interface or other mechanism by which users may provide or adjust indicators of the importance of these attributes to the user. The weights of the scoring algorithm may be adjusted accordingly.

A clearer understanding of embodiments can be had with reference to the examples below, where embodiments of threat prioritization scoring algorithm are depicted. It will be understood that the examples include specific embodiments and thus any restrictive language such as must, should, will, etc. should be taken as applying only to those particular embodiments as discussed in the example and not to embodiment generally. Following is a description of one example of an exemplary prioritization score formula. Other prioritization score formulas are also possible, as one skilled in the art would understand.

In the following exemplary prioritization scoring formula, it is assumed that there exists a set of threat indicator types ("ThreatIndicatorTypes"). In some examples, the threat indicator types may be either (1) critical (the event is only critical if you have at least one of these) or (2) non-critical (no amount of these should make the event critical by itself). In some examples, the threat indicator types have a weight. All critical threat indicator types are weighted relative to one another. All non-critical threat indicator types are weighted relative to one another. In this example, a minimum weight is 0 (does not contribute towards score) and a maximum weight is 1.0 (contributes most to the score). Examples of weights may include:

Bad Hash Blacklist—Critical, Weight: 1.0 (Highest)
Bad IP WebRoot—Critical, Weight: 0.25 (Lowest)
Unknown Hash—Non-Critical, Weight: 1.0 (Highest)
Unknown IP—Non-Critical, Weight: 0.5 (Lowest)

Note that a user can specify any values whatsoever for the weights. However, they should be normalized before use in the formula, e.g., a user specifies weights {50, 0, 100}->{0.5, 0.0, 1.0}.

In some embodiments, a threat score range includes:
Assess (0-29)
Suspicious (30-69)
Critical (70-100)
Following is an exemplary prioritization score formula:

$$ThreatScore =$$

$$\begin{cases} (70-\varepsilon) * \left(1 - \frac{1}{NonCriticalUnboundedScore}\right), & CriticalIndicators = \emptyset \\ 30 * \left(1 - \frac{1}{CriticalUnboundedScore + NonCriticalContributingScore}\right) + 70 & \text{otherwise} \end{cases}$$

$$CriticalUnboundedScore = \sum_{i=0}^{N} Weight_i * \sum (CriticalIndicators_i)$$

$$NonCriticalUnboundedScore = \sum_{j=0}^{M} Weight_j * \sum (NonCriticalIndicators_j)$$

$$NonCriticalUnboundedScore =$$

$$(MinCriticalWeight - \varepsilon) * \left(1 - \frac{1}{NonCriticalUnboundedScore}\right)$$

Note that the top half of the formula above is about satisfying the property "if there are no critical threat indicators, the overall threat score should not be critical." Next, compute the unbounded non-critical weighted sum (NonCriticalUnboundedScore), then bound it to less than 70. The bounding is done using a hyperbolic function (1/x) with asymptote at 70. This is used instead of a simple minimum to satisfy the property "if two events differ only by the count of a single threat indicator type, the event with the highest count should have a higher score." The bottom half of the formula deals with events that have at least one critical threat indicator. In that case, the formula computes the unbounded critical weighted sum (CriticalUnboundedScore) and/or computes the NonCriticalContributingScore. This is how the non-critical threat indicators contribute to the overall score, if there is a mix of critical and non-critical indicators. In some examples, you may not wish to simply sum the CriticalUnboundedScore and NonCriticalUnboundedScore. In some examples, 100,000 of the highest weight non-critical indicators (e.g. unknown IPs) should contribute less than 1 of the lowest weight critical indicators (e.g. Bad IP WebRoot). So, the NonCriticalUnboundedScore is computed, then bound it to the weight of the lowest critical weight.

Accordingly, by prioritizing events 103 based on the prioritization of the endpoints from which the events originated, a more effective prioritization mechanism for events 103 can be obtained whereby events that may result in the most harm to an enterprise may be prioritized over other events (e.g., in certain cases even if those other events may actually represent a greater likelihood of such a security breach occurring).

Figure 2:
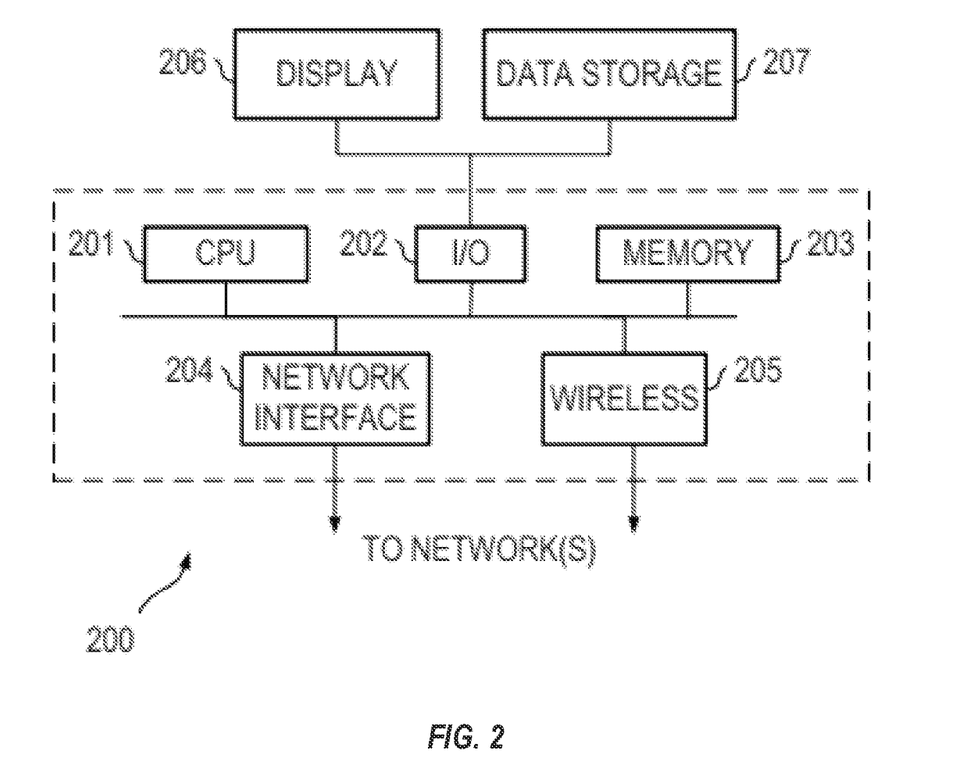
FIG. 2 depicts a diagrammatic representation of a data processing system for implementing an endpoint security system according to some embodiments disclosed herein.

FIG. 2 depicts a diagrammatic representation of a data processing system for implementing an endpoint security system disclosed herein. As shown in FIG. 2, data processing system 200 may include one or more central processing units (CPU) or processors 201 coupled to one or more user input/output (I/O) devices 202 and memory devices 203. Examples of I/O devices 202 may include, but are not limited to, keyboards, displays, monitors, touch screens, printers, electronic pointing devices such as mice, trackballs, styluses, touch pads, or the like. Examples of memory devices 203 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 200 can be coupled to display 206, information device 207 and various peripheral devices (not shown), such as printers, plotters, speakers, etc., through I/O devices 202. Data processing system 200 may also be coupled to external computers or other devices through network interface 204, wireless transceiver 205, or other means that is coupled to a network such as a local area network (LAN), wide area network (WAN), or the Internet.

The following inventive subject matter described herein is directed toward event threat prioritization of events which occur on devices, also referred to as endpoints. An event priority engine or method receives event data detected by event agents executing on devices. The events are prioritized and ranked according to threat scores for events generated according to threat indicators which are fed event data and threat data. A non-limiting example involving data exfiltration over the network of a company will help introduce and illustrate the inventive systems, methods, and techniques described herein.

An event or set of events detected by event agents on devices may signal, correlate to, or even be responsive to an attacker's data exfiltration of a network of a company. Typically, in this type of scenario, the attacker gathers intelligence regarding network activity and identifies a point-of-entry into the network. Once entry is gained, the attacker issues command-and-control communications and often moves laterally across and within the network to gain access to devices on the network. Once access is gained, the attacker attempts to copy and obtain data from devices, which may include highly confidential, sensitive, and/or privacy information, such as Personally Identifiable Information (PII) (social security numbers, passwords, residences, phone numbers, credit card numbers, etc.). Ideally, the event agent detects such activity and triggers events on devices which record various parameters of the data exfiltration at different stages, and such events can be accessed with a combination of the recorded parameters and other threat data to plug-into the threat indicators and arrive at a threat score (or level). The threat scores are used to rank events so that the highest-ranking events can be prioritized to garner the attention of threat and security evaluators.

It is well-known that many programs and applications have legitimate purposes and, therefore, cannot be blocked, a security loophole which attackers exploit. The event agent installed and executed on a device is tasked to detect activities and behaviors that may be legitimate, involve suspicious activity, or actual threats and security breaches. Another illustrative example involves a process (that an attacker may spark) to zip a folder of files and download the zipped files to a machine under the control of an attacker. In another scenario, an attacker may cause to open a common Windows Operating System application, such as Notepad, to execute malicious file operations and/or execute malware on the device. The event agent may detect events in and around such activities and record event data (such as in an event data structure) that can be analyzed, prioritized, and selected for evaluation to determine and discover events of a threatening nature (often among large numbers of events).

Moreover, the event data comprises attributes of events, including information about the device on which the event occurred. Such event data, in combination with threat data, can be fed into the threat indicators designed to detect and prioritize event threats. The threat indicators include a wide range of parameters that signal problematic and threatening activities. Such threat indicators incorporate information such as, but not limited to, suspicious programs (which may in fact be malware), known problematic Internet Protocol (IP) and domain values, and even device vulnerabilities, value, and whether a device stores sensitive PII.

More to this, event data for events comprise a snapshot of not only the event itself, but the state of the device on which the event occurred. The snapshot may include a variety of information (which may be referred to as "atoms" of the event and device) including, but not limited to, an IP address and/or a domain name, a hash value for processes related to the event (an event may include a set of processes, their execution, memory, and file usage), and whether an event is associated with known malware. The snapshot may also include behavioral information collected for the event. In additional non-limiting instances, event data incorporates information about the device on which the event occurred, such as whether the device stores and/or processes PII and an asset valuation of the device computed based on the primary user of the device (e.g., the primary user is the Chief Executive Officer of a company and therefore the device likely stores material confidential information of the company) and/or the primary user's group (e.g., the primary user is a member of the Human Resources department and therefore the device likely stores PII of employees of the company).

One advantage of the inventive subject matter is the merging and comparison of event data, device data, and threat data. The events represent data regarding the event and the device on which the event occurs. This event data may be combined and compared with threat data received by a variety of systems which detect, identify, analyze, and store threat data. This threat data takes on many forms and comprises, but is not limited to, known malware, IP addresses and domain name reputations, the presence of PII, threat machine learning models, asset valuations (i.e., the potential value and/or vulnerability of a device), server and repository scans, hash values for processes, and much more. The event data, for example, may include one or more IP addresses accessed during the event by a device. Such IP addresses may be compared to threat data listing "bad" IP addresses that are known by external software. If the event IP address matches a bad IP address, then a threat indicator value for IP address can be increased, thereby increasing the event threat score (calculated using a set of threat indicators) and potentially increasing the event's ranking vs other events. This effectively surfaces the event (because it accessed a bad IP address) for potential evaluation and action, such as isolating the device on which the event occurred, etc.

The threat indicators may be assigned a weight value, often relative to significance of a threat indicator compared with other threat indicators, in other words, the degree to which a threat indicator is determinative of a threat. The threat indicators may also be assigned a threat criticality that designates whether a threat indicator is critical or non-critical to determining threat level. The threat score, in this way, is modified by weights and criticalities of the threat indicators.

The advantages of the inventive subject matter include an ability to identify events and prioritize a threat level of the events. The events are detected at the device level, thereby allowing highly granular, specific, and responsive device-by-device threat evaluation. Because threat detection occurs at the source of the threat (i.e., the device and/or networks), a baseline state may be established for a device so that any deltas representing a state change or new or updated activity on the device may be detected, and such deltas (represented by an event) may be then processed and evaluated in a highly responsive manner.

Moreover, an existing problem is the sheer volume of detected events, only a small percentage of which involve actual suspicious activity and/or threats, which makes threat detection quite difficult and opaque, like finding a needle in a haystack. Quite often, many events that do indeed represent real threats are missed and/or overlooked due to the sheer volume and influx of events. The inventive subject matter alleviates this problem, providing not only a highly responsive and accurate assessment of threat level for events, but also a method for prioritizing events so that event evaluation better focuses on events that matter in the overall pack/fire hose of events.

Figure 3A:
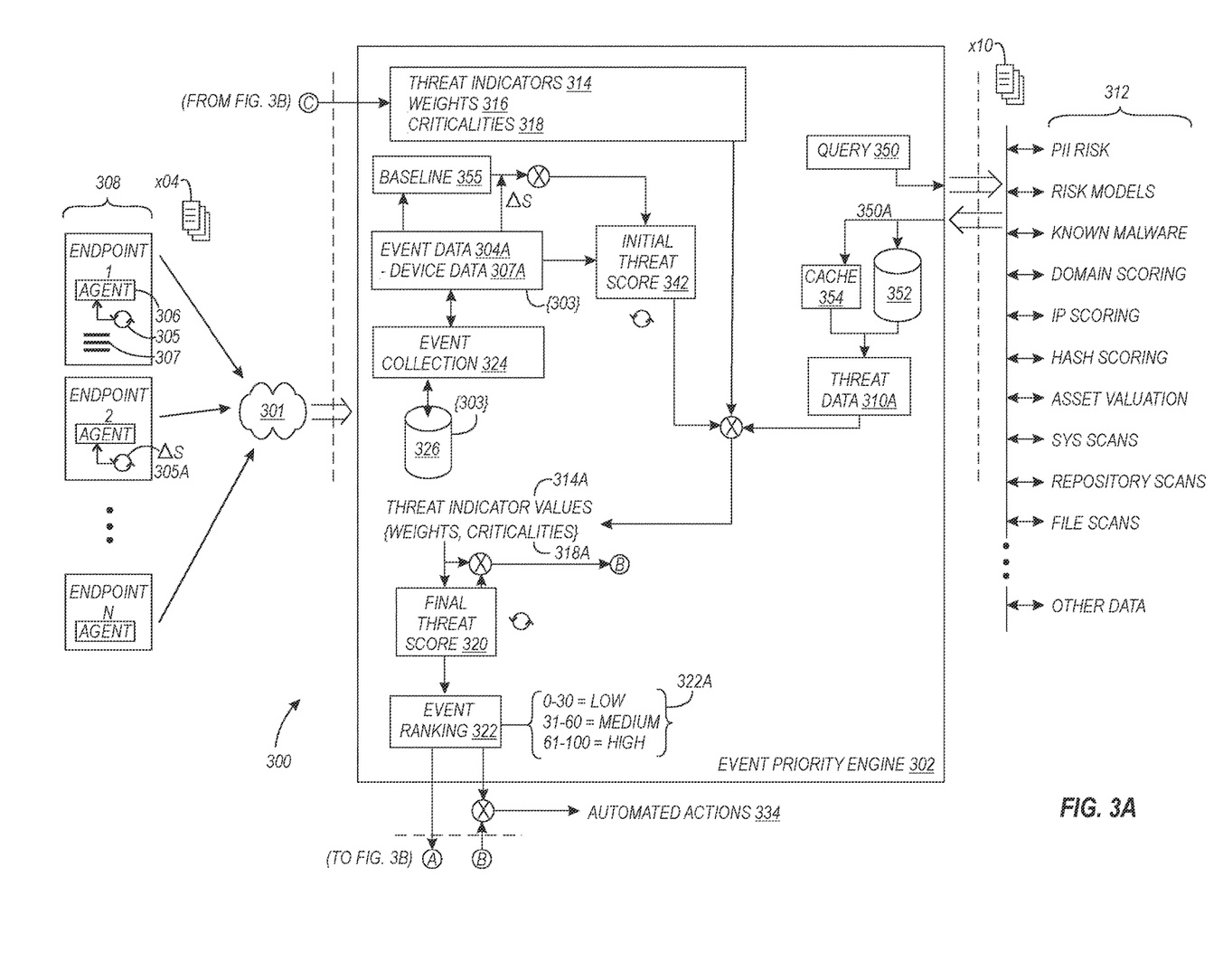
FIG. 3A depicts a system for evaluating event priority for events on devices.

Referring now to FIG. 3A, in one embodiment of the inventive subject matter, a system 300 for evaluating event priority for events on devices comprises a processor, a non-transitory computer-readable medium, and stored instructions translatable by the processor. The system executes an event priority engine 302 coupled over a network 301 to receive event data 304 for events 305 which occur on devices 308 (referred to in FIG. 3A as EndPoint 1, EndPoint 2, up to EndPoint N). Each device 308 executes an event agent 306 to detect the events 305 on devices 308. An event 305 can be said to represent a snapshot (or state) of the device 308 at the time the event 305 occurred and event parameters. Such a snapshot may be instantiated as an event data structure 303 with a variety of information including, but not limited to, an IP address and/or a domain name called in the event 305 (such as to call, retrieve, and display a webpage over the Internet), a hash value for processes related to the event 305 (an event 305 may include a set of processes, their execution, memory, and file usage), and whether an event 305 is associated with known malware. The event data structure 303 may include behavioral information collected for the event 305 and may incorporate information about the device 308 on which the event 305 occurred, such as whether the device 308 stores and/or processes PII. The event data structure 303 may incorporate device data 307 that identifies the primary user of the device 308 (e.g., the primary user is the Chief Executive Officer of a company) and/or the primary user's group (e.g., the primary user is a member of the Human Resources department). Also, the device name or a unique identifier may be defined in the event data structure 303.

In some embodiments, an event collector 324 collects event data 304 and stores the event data structure 303 in an event database 326. The event data 304 may be further processed, augmented, and stored (in the event data structure 303) in the event database 326.

The event priority engine 302 is further coupled to receive threat data 310 from threat data systems 312 which generate threat data 310. In many instances, the threat data 310 corresponds to and is used in combination with the event data 304 to generate threat information. Non-limiting examples of threat data systems 312 (as shown in FIG. 3A) include those that:

Assess PII risk (such as for files and the device on which the files are stored);
Employ risk machine learning models which may be trained to use dynamic parameters to assess risk;
Identify known malware and devices on which they were found, sources where they were obtained, etc.;
Score and/or categorize IP addresses based on a known and/or predetermined reputation;
Score domain names, similarly to IP addresses based on reputation;
Provide hash scoring of processes and/or malware;
Provide asset valuations of devices based on the primary user of the device (e.g., the asset valuation is higher for the Chief Executive Officer's device as it may likely include highly confidential information and/or may be a heightened target that needs to be hardened) and/or the primary user's group (e.g., the primary user is a member of the Human Resources group and therefore the device likely includes PII of employees);
Conduct system scans, such as scans of malware on services connected to a device;
Conduct repository scans, such as scans for repositories and databases accessed by the device;
Conduct file scans, which may identify malware;

Furthermore, the event priority engine 302 defines threat indicators 314. Many types of threat indicators 314 may be defined including, but not limited to, IP address and/or a domain names called within an event 305, hash values for processes related to the event 305 (an event 305 may include a set of processes, their execution, memory, and file usage), and whether an event 305 is associated with known malware. The threat indicators 314 may also include behavioral information collected for the event 305 and may incorporate information about the device 308 on which the event 305 occurred, such as whether the device 308 stores and/or processes PII. Device data 307A may include an asset valuation of the device computed based on the primary user of the device 308 and/or the primary user's group. Cumulatively, the threat indicators 314 serve to prioritize events 305 with higher probabilities of threat significance, so that such events 305 may be better surfaced and acted on.

In a further embodiment, one or more of the threat indicators 314 is associated with a threat indicator weight 316. The threat indicator weight 316 may be modified and/or applied to prioritize events 305. In some embodiments, the threat indicator weight 316 may be set to a fraction between 0.0 and 1.0. This is a way of normalizing the threat indicators 314 and their priority toward an overall threat assessment. A threat indicator 314 with a low weight is less of a priority than a threat indicator 314 with a high weight. In some embodiments, one or more of the threat indicators 314 is associated with a threat criticality 318, which may be either set to "critical" or "non-critical", though other values are possible (such as a scale of criticality). Here, threat indicators 314 that are critical contribute more significantly to the overall event priority. In contrast, threat indicators 314 that are non-critical have a low impact on the overall event priority.

The event priority engine 302 generates a threat score 320 for each event 305 based on threat indicator values 314A. The threat indicator values 314A are determined using a combination of the event data 304A (which includes the device data 307A) and threat data 310A, which may be gathered and received from the threat data systems 312. Non-limiting examples include a threat indicator 314 to assess the threat related to bad IP addresses that may be called in an event 305. The set of called IP addresses is compared to threat data 310A that specifies the reputations of IP addresses. If one or more of the called IP addresses matches an IP address with a bad reputation, the threat indicator value 314A is triggered to raise the priority of the event 305. The threat indicator value 314A may then be further modified by its weight 316A and its criticality 318A (as explained above). In another example, a threat indicator 314 assesses the risk of divulging PII on a device 308. Here, a device name or unique identifier is defined in the event 305 and compared with threat data 310A that includes a database of devices (and their names) with known PII. If the device 308 is found to have known PII, the threat indicator value 314A is triggered (and modified by weight 316A and criticality 318A). In this way, the threat indicator values 314A are generated and combined to arrive at a threat score 320 for each event 305.

The event priority engine 302 ranks the priority (at 322) of each event 305 according to its threat score 320. The ranks may be categorized into numerical ranges 322A on a scale, such as from 0-100 or 0.0 to 1.0. In a non-limiting example, rankings between 0-30 may be "Low Priority", rankings between 31-60 may be "Medium Priority", and rankings between 61-100 may be "High Priority". Referring now to FIG. 3B and again to FIG. 3A, rankings 322B may be provided to threat assessment users 325 who may view the rankings 322B (at GUI 330, designated as (A) in FIGS. 3A and 3B) and in combination with presented event data 304B, device data 307B, and threat data 310B determine an action 332 to be taken. For example, threat assessment users 325 may decide that no action need be taken and mute or whitelist an event (332A). In some cases, users 325 may determine that a high-ranked event is a false positive (332B) and ignore it. In other instances, users may open a threat evaluation ticket 332C for the event 305 and conclude that the device 308 needs to be isolated, shut down, repaired, or even wiped of its data and/or malware. In still other instances, users 325 may forward the event 305 to an endpoint investigation system 332D, which may trigger forensic artifact collection and other evaluation techniques and operations.

Figure 3B:
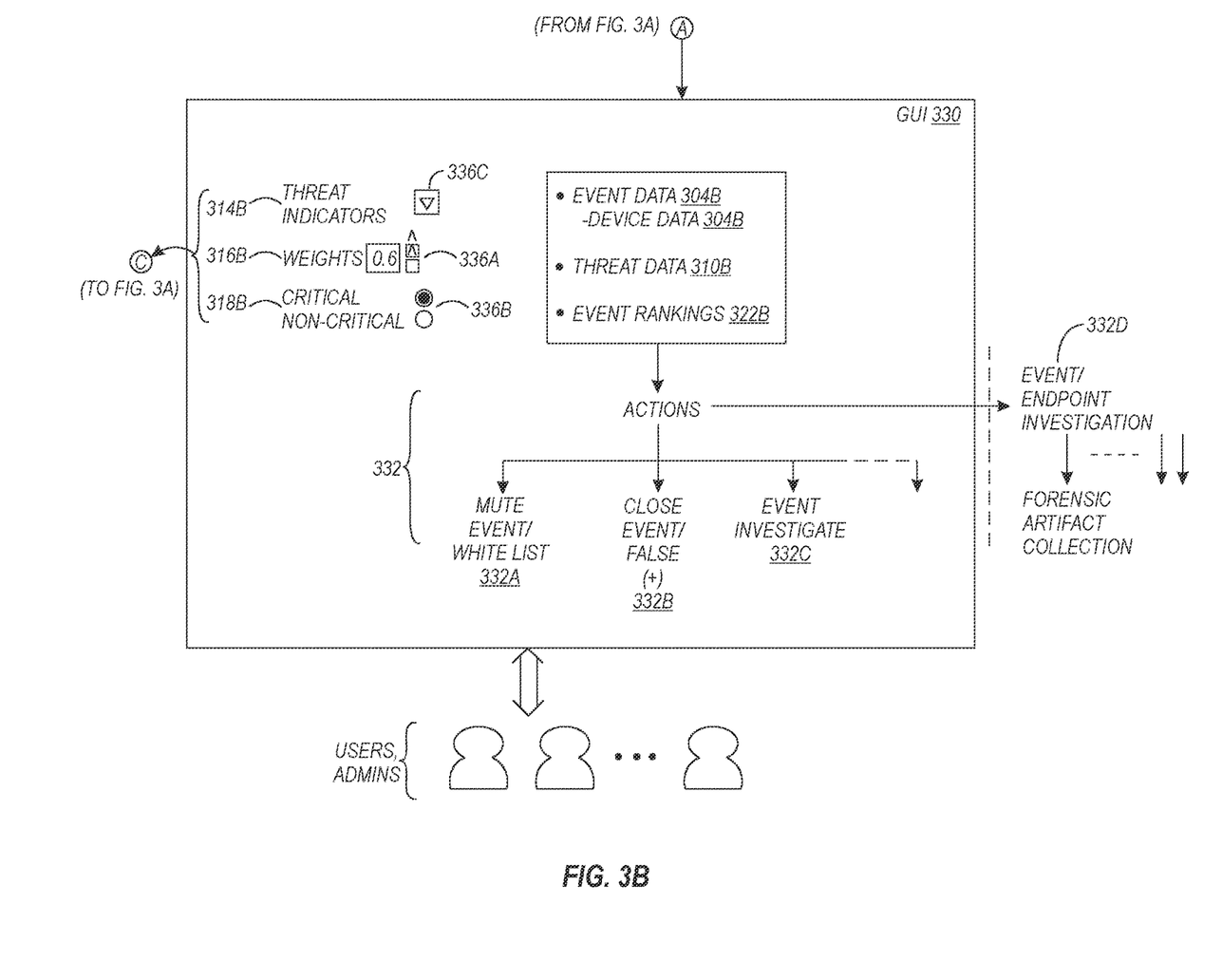
FIG. 3B depicts a GUI provided to threat assessment users.

Response to events 305 may be automated 334. For example, a threat handling model may be trained to handle high-priority events by collecting parameters and data fed into the model (designated by (B)) which determines an action to be taken, such as executing a process to automatically remediate the threat.

In further embodiments, threat indicator weights 316 and threat indicator criticalities 318 may have default values (which may be automatically configured and generated based on environmental settings and context). The event priority engine 302 may receive input from users 325 (designated by © in FIGS. 3A and 3B) to modify the weights 316 and/or criticalities 318 based on needs and/or tests or a desire to raise the influence of certain threat indicators 314. For example, as seen on FIG. 3B, users and administrators 325 may use "up-and-down" buttons 336A to raise and lower the weights 316B as values between 0.0 and 1.0. A non-limiting example is when PII security is of the upmost importance; in such an instance, a user or administrator 325 may increase the weight 316B of a threat indicator 314B (or indicators) that assess PII risk and/or change criticality 318B from non-critical to critical, such changes forwarded and received as input to the event priority engine 302. For example, as seen on FIG. 3B, users and administrators 325 may use radio-selection buttons 336B to select "Critical" or "Non-critical". Furthermore, users and administrators 325 may select which threat indicator to work with using a drop-down list selector 336C to select a threat indicator. In other embodiments, users and administrators 325 may select from amongst a predefined set of threat indicators 314B to use in the threat score generation 320. In still further embodiments, users and administrators 325 may design their own custom threat indicators, either from scratch or by combining two or more threat indicators 14B to determine a final value. Users and administrators 325 may even customize how the threat score 320 is generated, such as by (but not limited to) determining the contribution of critical threat indicators vs. non-critical threat indicators. In this way, users and administrators 325 have wide flexibility to customize threat indicators 314, threat scoring 320, and event ranking 322 for threat evaluation based on the needs, desires, and/or requirements (such as to design and execute threat scoring and ranking according to an industry or government standards and/or compliance).

In some embodiments, the event priority engine 302 generates an initial threat score 342 for each event 305 based on the event data 304A received for the event 305. The event priority engine 302 queries (at 350) one or more threat data systems or additional threat data 310A. For example, the event priority engine 302 may query an asset valuation system, passing the device name and receiving asset valuation for the device 308. The event priority engine 302 uses the query response 350A to regenerate the threat indicator values 314A and generates a final threat score 320 based on the initial threat score 342 and the regenerated values 314A of the threat indicators 314.

In other embodiments, the event priority engine 302 stores threat data 310A in a database 352 and queries the database 352 for threat data 310A. The event priority engine 302 may periodically re-query the threat data systems 312 to update the database 352, and/or the threat data systems 312 may push updated threat data 310 to the database 352.

Instead of a database 352, or in addition to, the event priority engine 302 may copy threat data 310A to fast memory, such as a threat data cache 354 so that threat data 310A may be quickly accessed for the threat score generation.

In one embodiment, the event priority engine 302 establishes a baseline snapshot 355 or state for a device 308. Here, the event agent 306 may then monitor the device 308 for new events 305A representing "deltas" for the device 308, such as file changes, the addition of PII, and/or download of certain processes. The delta events 305A may be forwarded to the threat data systems 312 so that the threat data systems 312 can regenerate the threat data 310 or define new threat data 310. For example, it may be that a user receives a set of new files containing credit card numbers, usernames, and passwords and stores the files on the device 308. The event agent 306 can send the new files to an external PII risk assessment system which can then update the device's PII risk. In still further embodiments, it is envisioned that the event agent 306 itself may access and update the device's PII risk based on the new files. In this way, event priority and threat evaluation are focused and established on devices 308 themselves where activity occurs and so is highly responsive and granular. Plus, tracking delta activity in events (305, 305A) makes baseline vs delta device comparisons possible to detect and prioritize dynamic activity as it happens.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A system for evaluating event priority for events on devices, comprising:
    a processor;
    a non-transitory computer-readable medium; and
    stored instructions translatable by the processor for executing an event priority engine, wherein the event priority engine is coupled over a network to a plurality of devices, wherein the event priority engine is configured to:
    receive events from the plurality of devices, the events occurring over the plurality of devices, each device executing an event agent to detect the events on the plurality of devices;
    receive threat data from a plurality of threat data systems, the plurality of threat data systems generating the threat data;
    define a plurality of threat indicators, each threat indicator being associated with a threat indicator weight, wherein the plurality of threat indicators being designed to detect and prioritize event threats;
    for each received event:
        determine a count of occurrences of sensitive data on each device by scanning each device;
        generate a threat score for each received event based on values of the threat indicators and the threat indicator weights;
            modify the threat score for each received event based on the count of occurrences of sensitive data on a respective device associated with the received event;
    rank the events by priority according to the modified threat score generated for each received event.

2. The system of claim 1, wherein each threat indicator has a threat indicator criticality set to critical or non-critical, each threat indicator value further modified by the threat indicator criticality.

3. The system of claim 2, wherein the event priority engine receives input indicating at least one of: a modification to one of the threat indicator weights and, a modification to one of the threat indicator criticalities.

4. The system of claim 1, wherein the modified threat score for each received event is a final threat score, the event priority engine further generating an initial threat score for each received event based on the event data:
    the event priority engine querying at least one threat data system for threat data and, in response to the querying, receiving the threat data from the at least one threat data system;
    the event priority engine regenerating the values of the threat indicators based on the received threat data; and the event priority engine further generating the final threat score based on the initial threat score and the regenerated values of the threat indicators.

5. The system of claim 4, wherein the received threat data is stored in a threat database coupled to the event priority engine, the event priority engine copying the threat data into the threat database and querying the threat database for the threat data.

6. The system of claim 4, wherein the received threat data is stored in a threat data cache of the event priority engine, the event priority engine copying the threat data into the threat data cache and querying the threat data cache for the threat data.

7. The system of claim 1, wherein one of the events reflects a modification to one of the devices, the event priority engine sending the modification to at least one of the threat data systems and, in response, the event priority engine receiving modified threat data based on the modification.

8. A method for evaluating event priority for events-on devices, comprising:
   receiving events from a plurality of devices, each device executing an event agent to detect the events on the plurality of devices;
   receiving, at an event priority engine, threat data from a plurality of threat data systems coupled to the event priority engine;
   defining a plurality of threat indicators, each threat indicator being associated with a threat indicator weight, the threat indicators being designed to detect and prioritize event threats;
   for each received event:
      determine a count of occurrences of sensitive data on each device by scanning each device;
      generate a threat score for each received event based on values of the threat indicators and the threat indicator weights;
      modify the threat score for each received event based on the count of occurrences of sensitive data on a respective device associated with the received event;
   rank the events by priority according to the modified threat score generated for each received event.

9. The method of claim 8, wherein each threat indicator has a threat indicator criticality set to critical or non-critical, each threat indicator value further modified by the threat indicator criticality.

10. The method of claim 9, further comprising:
    receiving, at the event priority engine, input indicating at least one of: a modification to one of the threat indicator weights and, a modification to one of the threat indicator criticalities.

11. The method of claim 8, wherein the modified threat score for each received event is a final threat score, further comprising:
    generating an initial threat score for each received event based on the event data;
    querying at least one threat data system for threat data and, in response, receiving the threat data from the at least one threat data system;
    regenerating the values of the threat indicators based on the received threat data; and
    generating the final threat score based on the initial threat score and the regenerated values of the threat indicators.

12. The method of claim 11, wherein the received threat data is stored in a threat database coupled to the event priority engine, further comprising: copying the threat data into the threat database; and querying the threat database for the threat data.

13. The method of claim 11, wherein the received threat data is stored in a threat data cache of the event priority engine, further comprising: copying the threat data into the threat data cache; and querying the threat data cache for the threat data.

14. The method of claim 8, wherein one of the events reflects a modification to one of the devices, further comprising: sending the modification to at least one of the threat data systems, the event priority engine, in response, receiving modified threat data based on the modification.

15. A computer programming product comprising a non-transitory computer-readable medium storing instructions translatable by a processor for:
    receiving events from a plurality of devices, each device executing an event agent to detect the events on the plurality of devices;
    receiving, at an event priority engine, threat data from a plurality of threat data systems coupled to the event priority engine;
    defining a plurality of threat indicators, each threat indicator being associated with a threat indicator weight, the threat indicators being designed to detect and prioritize event threats;
    for each received event:
       determine a count of occurrences of sensitive data on each device by scanning each device;
       generate a threat score for each received event based on values of the threat indicators and the threat indicator weights;
       modify the threat score for each received event based on the count of occurrences of sensitive data on a respective device associated with the received event;
    rank the events by priority according to the modified threat score generated for each received event.

16. The computer programming product of claim 15, wherein each threat indicator has a threat indicator criticality set to critical or non-critical, each threat indicator value further modified by the threat indicator criticality.

17. The computer programming product of claim 16, wherein the event priority engine receives input indicating at least one of: a modification to one of the threat indicator weights and, a modification to one of the threat indicator criticalities.

18. The computer programming product of claim 15, wherein the modified threat score for each received event is a final threat score and the event priority engine further:
    generates an initial threat score for each received event based on the event data, queries at least one threat data systems for threat data and, in response, receives the threat data from the at least one threat data system;
    regenerates the values of the threat indicators based on the received threat data; and
    generates the final threat score based on the initial threat score and the regenerated values of the threat indicators.

19. The computer programming product of claim 18, wherein the received threat data is stored in a threat database coupled to the event priority engine and is stored in a threat data cache of the event priority engine, the event priority engine further: queries one of: the threat database for the threat data or, the threat data cache for the threat data.

20. The computer programming product of claim 15, wherein one of the events reflects a modification to one of the devices, the modification sent to at least one of the threat data systems, the event priority engine, in response, receiving modified threat data based on the modification.

* * * * *